US010097655B2

(12) United States Patent
Dawoud Shenouda Dawoud et al.

(10) Patent No.: US 10,097,655 B2
(45) Date of Patent: *Oct. 9, 2018

(54) PRESENCE-BASED CONTENT CONTROL (71) Applicant: Microsoft Technology Licensing, LLC, Redmond, WA (US)

(72) Inventors: Peter Dawoud Shenouda Dawoud, Redmond, WA (US); Nelly Porter, Kirkland, WA (US); Himanshu Soni, Bothell, WA (US); Dustin Michael Ingalls, Carnation, WA (US); Kyle James Krum, Sammamish, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,909

(22) Filed: Apr. 19, 2017

(65) Prior Publication Data
US 2017/0223125 A1    Aug. 3, 2017

Related U.S. Application Data

(63) Continuation of application No. 14/485,546, filed on Sep. 12, 2014, now Pat. No. 9,661,091.

(51) Int. Cl.
*G06F 7/04* (2006.01)
*H04L 29/06* (2006.01)
(Continued)

(52) U.S. Cl.
CPC ............ *H04L 67/24* (2013.01); *H04L 47/808* (2013.01); *H04N 21/4223* (2013.01); *H04N 21/4532* (2013.01)

(58) Field of Classification Search
CPC ... H04L 67/24; H04L 47/808; H04N 21/4223; H04N 21/4532
(Continued)

(56) References Cited

U.S. PATENT DOCUMENTS 6,674,458 B1    1/2004   Cohen-Solal et al.
7,698,720 B2    4/2010   Matz
(Continued)

FOREIGN PATENT DOCUMENTS

WO    WO-2011037761    3/2011

OTHER PUBLICATIONS

"Final Office Action", U.S. Appl. No. 14/485,546, dated Aug. 9, 2016, 18 pages.
(Continued)

*Primary Examiner* — Aravind K Moorthy
(74) *Attorney, Agent, or Firm* — Fiala & Weaver P.L.L.C.

(57) ABSTRACT

Presence based content access control techniques are described in which presence of users is used as a basis for enforcing content restrictions. In an implementation, applications are registered to receive feedback regarding users' presence in relation to a presentation of content via a computing device. The presence of users is recognized independently of authentication of the users to access user accounts. For example, an imaging sensor such as camera may be employed for recognition of multiple users engaged with the computing device. In addition or alternatively, presence devices associated with users such as badges, key fobs, or access cards may be detected to ascertain the presence of users. Feedback indicative of the one or more users that are recognized may then be supplied to the registered applications. The feedback enables the applications to control the presentation of content by enforcing content restrictions and/or taking other presence based actions.

20 Claims, 8 Drawing Sheets

(51) Int. Cl.
*H04L 9/32* (2006.01)
*G06F 21/00* (2013.01)
*G06K 9/00* (2006.01)
*H04L 29/08* (2006.01)
*H04L 12/927* (2013.01)
*H04N 21/45* (2011.01)
*H04N 21/4223* (2011.01)

(58) Field of Classification Search
USPC ............ 726/2, 4, 5; 713/166, 168, 182, 186; 382/115, 118
See application file for complete search history.

(56) References Cited

U.S. PATENT DOCUMENTS

| | | | |
|---|---|---|---|
| 8,131,763 B2 | 3/2012 | Tuscano et al. | |
| 8,281,366 B1 | 10/2012 | McCorkendale et al. | |
| 8,359,642 B1 | 1/2013 | Wurtenberger et al. | |
| 8,375,080 B2 | 2/2013 | Kim et al. | |
| 8,523,667 B2 | 9/2013 | Clavin et al. | |
| 8,600,110 B1 | 12/2013 | Chan et al. | |
| 9,661,091 B2 | 5/2017 | Dawoud et al. | |
| 2007/0024580 A1* | 2/2007 | Sands | G06F 3/011 345/156 |
| 2007/0067852 A1* | 3/2007 | James | G06F 21/35 726/28 |
| 2007/0124547 A1 | 5/2007 | Bedi et al. | |
| 2009/0041311 A1 | 2/2009 | Hundley | |
| 2009/0133051 A1 | 5/2009 | Hildreth | |
| 2010/0122277 A1 | 5/2010 | Fonseca | |
| 2010/0205667 A1* | 8/2010 | Anderson | G06F 3/013 726/19 |
| 2011/0072452 A1 | 3/2011 | Shimy et al. | |
| 2011/0231892 A1 | 9/2011 | Tovar | |
| 2011/0321143 A1 | 12/2011 | Angaluri et al. | |
| 2012/0041829 A1* | 2/2012 | Rothschild | G06Q 30/06 705/26.1 |
| 2012/0167123 A1 | 6/2012 | Gavita | |
| 2012/0174143 A1 | 7/2012 | Yang et al. | |
| 2013/0057573 A1 | 3/2013 | Chakravarthula et al. | |
| 2013/0208103 A1* | 8/2013 | Sands | G06F 21/31 348/78 |
| 2013/0304817 A1* | 11/2013 | Hu | H04N 21/41407 709/204 |
| 2014/0023248 A1 | 1/2014 | Yoo et al. | |
| 2014/0298486 A1 | 10/2014 | Robertson | |
| 2015/0040201 A1 | 2/2015 | Nyisztor et al. | |
| 2015/0358331 A1* | 12/2015 | Rachalwar | H04L 63/105 726/7 |
| 2016/0012475 A1 | 1/2016 | Liu | |
| 2016/0080510 A1 | 3/2016 | Dawoud et al. | |

OTHER PUBLICATIONS

"International Preliminary Report on Patentability", Application No. PCT/US2015/049540, dated Dec. 2, 2016, 8 pages.

"International Search Report and Written Opinion", Application No. PCT/US2015/049540, dated Dec. 2, 2015, 13 pages.

"Non-Final Office Action", U.S. Appl. No. 14/485,546, dated May 27, 2016, 16 pages.

"Notice of Allowance", U.S. Appl. No. 14/485,546, dated Jan. 19, 2017, 9 pages.

"Second Written Opinion", Application No. PCT/US2015/049540, dated Jul. 22, 2016, 7 pages.

Rowley,"Large Scale Image-Based Adult-Content Filtering", In Proceedings of the First International Conference on Computer Vision Theory and Applications, vol. 1, Feb. 25, 2006, 7 pages.

* cited by examiner

PRESENCE-BASED CONTENT CONTROL

RELATED APPLICATION

This application is a continuation of and claims priority to U.S. patent application Ser. No. 14/485,546 filed Sep. 12, 2014 entitled "Presence-Based Content Control", the disclosure of which is incorporated by reference herein in its entirety.

BACKGROUND

Computing device users may use accounts to access various computing resources, such as web services, television, movies, games, music, applications, and so forth. Authentication of users to prove the users "are who they say they are", differentiate between users, and provide selective access to computing resources is a persistent challenge faced by service providers. Traditionally, authentication techniques for a device involve sign-in of users to accounts using shared secrets such as passwords and/or digital tokens (e.g. ticket granting tickets TGTs, encrypted blobs, cookies, or other sign-on credentials). Generally, a single user account at a time is activated on a particular device and privileges associated with the activated account (e.g., the "logged-on" account) control the resources that may be accessed. In a traditional approach, content restrictions, such as aged based restrictions for children established by parents or access/security restrictions established for employees by employers (e.g., a system administrator), are coupled to the logged-in account.

However, coupling of content restrictions to a logged-in account may not be ideal for multiple user scenarios, such as for families that prefer to share a single family account, viewing of movies or other media content by multiple parties at the same time, and/or in business collaboration sessions and/or meetings among parties having different access levels. For example, an under-aged user may have access to restricted content when using a parent's account or when watching television programming along with a parent. Likewise, protected content may be inadvertently shared with participants in a business collaboration that lack permission to view the protected content when content restrictions are coupled to the logged-in account. Thus, although account based authentication techniques may be effective, there are some drawbacks associated with existing techniques, particularly in relation to multiple user scenarios.

SUMMARY

Presence based content control techniques are described in which presence of users with respect to a computing device is used as a basis for enforcing content restrictions. In an implementation, applications are registered to receive feedback regarding users' presence in relation to a presentation of content via a computing device. The presence of one or more users is recognized independently of authentication of the users to access user accounts. For example, an imaging sensor such as camera may be employed for recognition of multiple users engaged with the computing device. In addition or alternatively, presence devices associated with users such as badges, key fobs, or access cards may be detected to ascertain the presence of users. Feedback indicative of the one or more users that are recognized may then be supplied to the registered applications. The feedback enables the applications to control the presentation of content by enforcing content restrictions and/or taking other presence-based control actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Access control that relies upon coupling of content restrictions to a logged-in account may not be ideal for some scenarios, such as for families that prefer to share a single family account, viewing of movies or other media content by multiple parties at the same time, and/or in business collaboration sessions and/or meetings among parties having different access levels. In these and other scenarios that control access based on the logged-in account, restricted content may be inadvertently shared with unauthorized participants viewing the content along with the logged-in user or using a shared account.

Presence based content access control techniques are described in which presence of users with respect to a computing device is used as a basis for enforcing content restrictions. In an implementation, applications are registered to receive feedback regarding users' presence in relation to a presentation of content via a computing device. The presence of one or more users is recognized independently of authentication of the users to access user accounts. For example, an imaging sensor such as camera may be employed for recognition of multiple users engaged with the computing device. In addition or alternatively, presence devices associated with users such as badges, key fobs, or access cards may be detected to ascertain the presence of users. Feedback indicative of the one or more users that are recognized may then be supplied to the registered applications. The feedback enables the applications to control the presentation of content by enforcing content restrictions and/or taking other presence based actions.

By considering user presence indications, the system may be configured to support access control for additional scenarios and for groups of users in multi-user interactions. For example, when a child walks into a room in which an adult is watching movie, the presence of the child may be recognized and parental restrictions may be applied to pause the movie and/or present a notification of presence of a restricted user. Other presence based actions are also contemplated, such as blacking-out the display screen or otherwise hiding restricted content, switching to an edited version of the content, and/or recommending alternate programming, to name a few examples. Moreover, the enforcement of the parental restrictions may occur while the authorized user (e.g., the adult) is logged-in and without having to sign-in or perform authentication of the restricted user (e.g., the child) to access a corresponding account. Thus, content restrictions may be applied relatively quickly in response to recognition of the presence of users in comparison to techniques that rely upon authentication of each user individually and/or switching between accounts to enforce content restrictions.

In the discussion that follows, a section titled "Operating Environment" is provided and describes one example environment in which one or more implementations can be employed. Following this, a section titled "Presence-Based Content Control Details" describes example details and procedures in accordance with one or more implementations. Last, a section titled "Example System" describes example computing systems, components, and devices that can be utilized to implement one or more implementations.

Operating Environment

Figure 1:
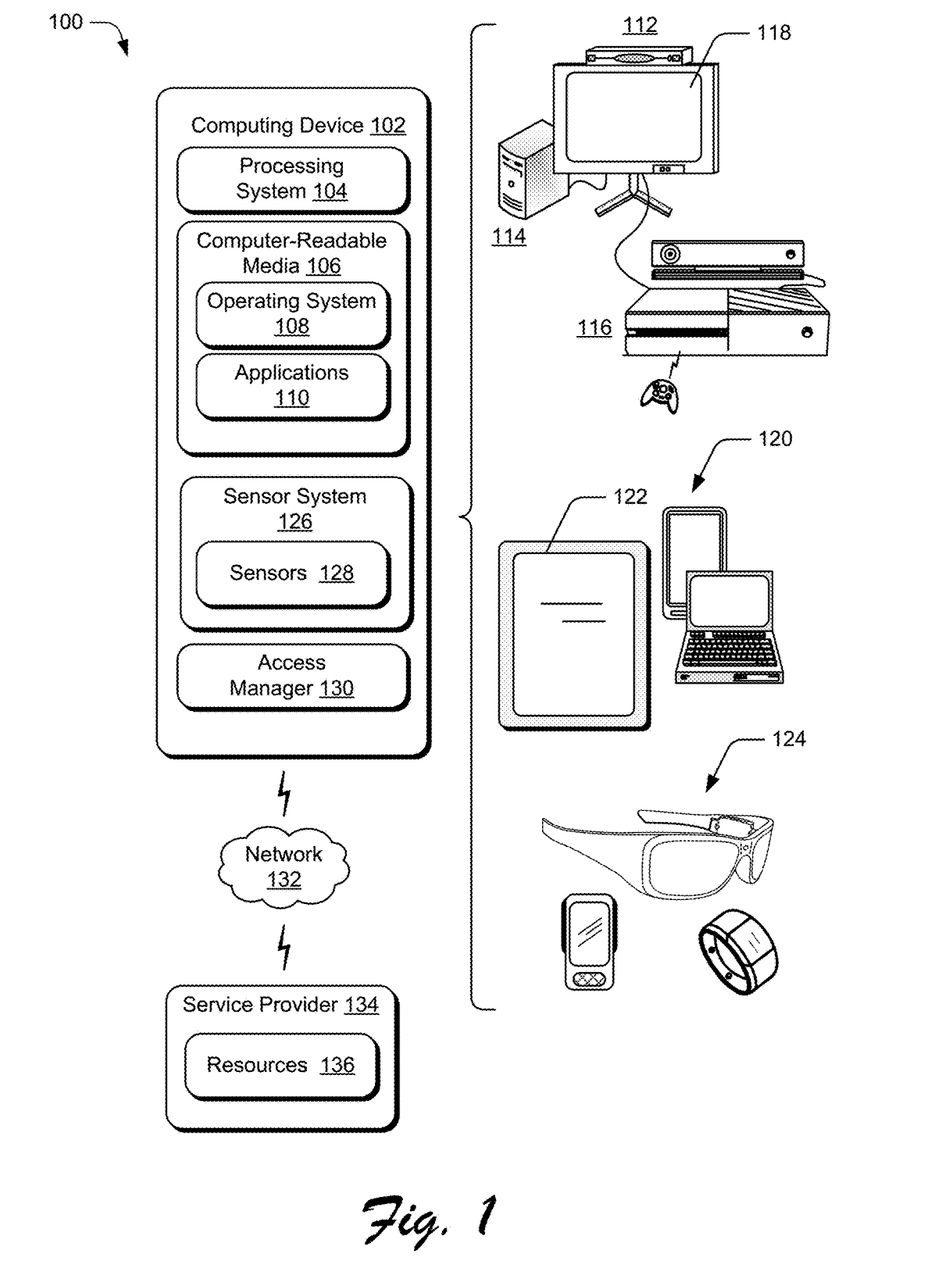
FIG. 1 illustrates an example operating environment in accordance with one or more implementations.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 8.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 8.

The computing device 102 may also include a sensor system 126 having one or more sensors 128 and an access manager 130. The sensor system 126 and one or more sensors 128 are configured to enable collection of a variety of different sensor data. In accordance with techniques described herein, sensor data obtained from the sensors may be processed and/or combined to recognize presence of users in various ways. A variety of different types of sensors and techniques suitable to recognize presence of users may be employed as discussed. The sensors 128 may also be configured to provide functionality relating to recognition of inputs and/or provision of outputs by the computing device 102.

For instance, the operating system 108 and/or application may be configured to use information obtained via the sensor system 126 to identify users, objects and gestures and cause operations to be performed that correspond to the recognized users, objects, and/or gestures. By way of example, the operating system 110 may be configured to receive one or more inputs via touch interaction with a hardware device, such as a cursor control device (e.g., a mouse), such as a mouse, a stylus, a game controller, a remote control (e.g. a television remote control), a mobile communication device (e.g., a wireless phone configured to control one or more operations of the computing device 102), and other devices that involve touch on the part of a user or object. Recognition of the touch inputs may be leveraged by the operating system 110 to interact with a user interface output by the computing device 102, such as to interact with a game, an application, browse the internet, change one or more settings of the computing device 102, and so forth. Touch interaction may involve pressing a button, moving a joystick or thumbstick, movement across a track pad, use of a touch screen of the display device 118 (e.g., detection of a finger of a user's hand or a stylus), using a touch screen and/or controls of a hardware device, and so on.

Additionally, the operating system 110 may support a natural user interface (NUI) that is configured to use information obtained via the sensor system 126 to recognize interactions that may not involve touch. The natural user interface (NUI) may also be used to recognize presence of users in relation to the computing device. For example, the sensors 128 may include one or more NUI input devices that may be configured in a variety of ways to detect inputs without having a user touch a particular device, such as through use of a microphone and/or image capture devices, e.g., a camera. The microphone may be configured to support voice recognition to recognize particular utterances (e.g., a spoken command) as well as to recognize a particular user that provided the utterances. The image capture device(s) may be configured to support recognition of gestures, presented objects, images, head/face tracking, facial recognition, body movements(s), and so on. A camera, for instance, may be configured to include multiple lenses so that different perspectives may be captured and thus determine depth. The different perspectives, for instance, may be used to determine a relative distance of objects/user from a computing device and thus a change in the relative distance.

In addition or alternatively, a time-of-flight camera may be utilized to determine relative distances of objects, e.g., arms, hands, fingers, legs, torso, and head of a user. For instance, the time-of-flight camera may capture images that are analyzed to recognize one or more motions made by a user, including what body part is used to make the motion as well as which user made the motion. Different motions may be identified as different gestures by the operating system 108 to initiate corresponding functions. Thus, an NUI input device may be leveraged to support depth perception in a variety of different ways. The images captured by one or more image capture devices may also be leveraged to provide a variety of other functionality, such as techniques to identify particular users (e.g., through facial recognition), recognize badges or other objects associated with different users, and so on.

The access manager 130 is representative of functionality implemented in software, firmware, hardware, or a combination thereof that is operable to manage and control output of content and user interfaces via a display device associated with the computing device. The access manager 130 may be provided as a standalone component (as illustrated), as component of the operating system 108, or otherwise. The access manager 130 may control content in accordance with user presence indications and restrictions that are associated with users recognized as being present in the context of a particular interaction scenario. For example, the access manager 130 may enable establishment of content restrictions for devices on a device by device basis, and/or for a group of related devices (e.g., multiple devices managed for a family group, business group, etc.). Content restrictions may include but are not limited to age-based restrictions, time-based restrictions, access-level restrictions, category based restrictions, media and/or application specific restrictions, content source restrictions, and ratings based restrictions, to name some examples. Different users of a device or device group may be associated with different content restrictions, such as via user profiles for different users, a restriction table, or other data structure. Rather than being associated with user accounts (e.g., service accounts), the content restrictions may be maintained by the access manager 130 in connection with user identity data utilized to recognize user presence and distinguish between different users. Content restrictions may be device specific and/or may be synchronized between multiple devices in a device group.

As mentioned, the recognition of user presence may occur based on data collected from various sensors and without each user having to log-in to a user account associated with the system. Thus, content restrictions associated with one user may be applied even when an account associated with a different user is being utilized to gain access to the content. The access manager 130 may enable parents, system administers, and/or device owners to selectively opt-in or opt-out of presence-based content control as well as to make selections to configure content restrictions and other settings. The set-up for presence-based content control may occur via an initial device set-up sequence, via a settings dialog exposed via the access manager, via operating system or device settings functionality, or otherwise. Details regarding these and other aspects of presence-based content control are discussed in relation to the following figures.

The environment 100 further depicts that the computing device 102 may be communicatively coupled via a network 132 to a service provider 134, which enables the computing device 102 to access and interact with various resources 136 made available by the service provider 134. The resources 136 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of presence-based content control.

Presence-Based Content Control Details

To further illustrate, consider the discussion in this section of example devices, components, procedures, and implementation details that may be utilized to provide presence-based content control as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 2:
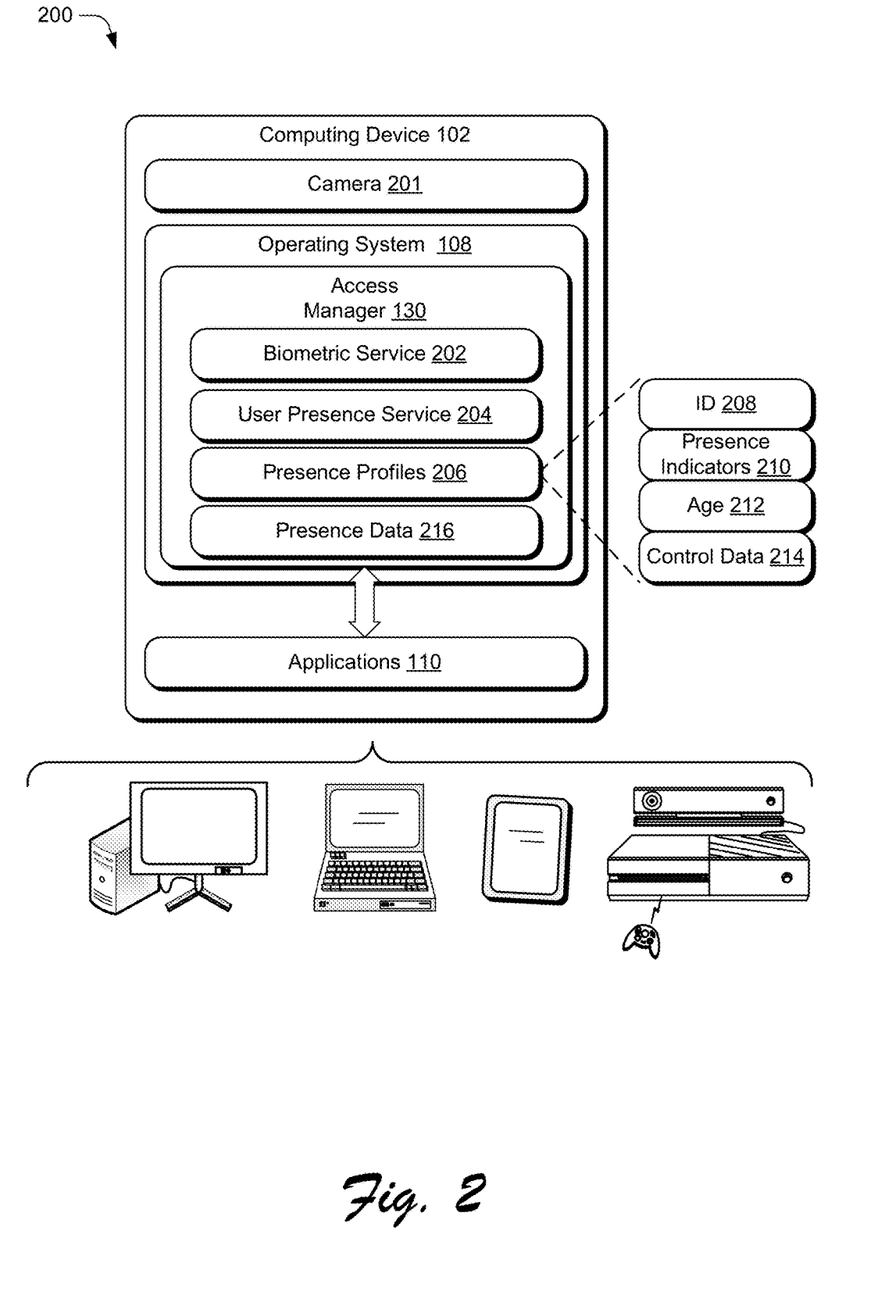
FIG. 2 is diagram depicting example details of access manager for a computing device in accordance with one or more implementations.

FIG. 2 depicts generally at 200 example details of an access manager 130 that may be provided with a computing device 102 in accordance with one or more implementations. By way of example and not limitation, the access manager 130 is illustrated in FIG. 2 as being implemented as a component of an operating system 108. The example computing device 102 is also depicted as having one or more applications 110 and a camera 201 (or other image capture device/system), which may be part of a sensor system 126 and configured in various ways, examples of which were discussed previously in relation to FIG. 1.

As noted above, the access manager 130 is representative of functionality operable to manage and control output of content and user interfaces via a display device associated with the computing device, such as a display device 118 or an integrated display 122. In one or more implementations, the access manager 130 generates indications of user presence upon which various control actions to control a content presentation may be at least partially based. Various control actions as described throughout this document may be performed directly by the access manager 130. In addition or alternatively, the access manager 130 may be configured to interact with applications 110 to initiate and/or enable control actions by the applications 110 responsive to indications of user presence supplied via the access manager 130.

In one or more implementation, the computing device may be configured to transition between account-based content control and presence-based content control in different contexts. Account-based content control and presence-based content control may be applied separately and/or in various combinations. Accordingly, the access manager 130 may initiate transitions from performing control actions to control presentation of content based on a logged-in user account to performing control actions to control presentation of content based on the recognition users indications of user presence, or vice versa. For example, feedback supplied to applications 110 may cause the applications 110 to transition between account-based content control and presence-based content control. In addition or alternatively, the access manager 130 may operate to cause transitions between account-based content control and presence-based content in response to indications of user presence through interaction with individual applications on a per application basis and/or globally for the computing device by using a global setting or otherwise.

The access manager 130 may be configured in various ways to obtain indications of user presence. By way of example, the example access manager 130 in FIG. 2 is depicted as including a biometric service 202, a user presence service 204, and presence profiles 206. The biometric service 202 is representative of functionality to obtain and process biometric data regarding users via the camera 201 and/or other sensors. Biometric data may include but is not limited to facial images, facial recognition patterns, voice patterns, fingerprints, pulse rates, and other data. The user presence service 204 is representative of functionality to recognize presence of one or more users in accordance with presence-based content control techniques described herein. The recognition may be based upon biometric data and/or other presence indicators collected from the camera 201 or other sensors 128 of the computing device.

The user presence service 204 may generate, manage, maintain or otherwise make use of presence profiles 206 that are associated with users to recognize and distinguish between the different users. Presence profiles 206 represent data in any suitable format that may be used to associate presence indicators detectable by the system to individual users. For example, a presence profile 206 may be configured to associate user IDs 208 (e.g., a name, alias, and/or ID field) for a user with presence indicators 210 that may be used to recognize the user. By way of example and not limitation, the presence indicators 210 may include images of the user, facial recognition patterns, body patterns/signatures, presence device associations (e.g., identifying data for badges or access card), and so forth. The presence profiles 206 may additionally include indications regarding the age 212 of users and control data 214 that specifies content authorizations and restrictions established for the users.

In operation, data collected via the sensors 128 may be processed to derive indicators associated with different users, which may be compared to presence profiles 206 to recognize and distinguish between the different users. One or multiple users may be recognized as being present with respect to a computing device and/or content presentation based on the comparison of sensor data to the presence profiles 206. The recognition may occur independently of authentication of a user(s) to access a user account, log-in the user to the system, and/or activate a "logged-in" account.

Applications 110 may register with the access manager 130 to receive feedback regarding users' presence. The feedback may be in the form of presence data 216 that is generated responsive to recognition of the users. The presence data 216 may be configured to convey indications of user presence for recognized users including but not limited indications regarding age 212 and control data 214 (e.g. authorizations and/or restrictions). Thus, control actions may be taken to control a content presentation based at least in part upon the present users, and the ages and/or restrictions associated with the users. For example, the access manager 130 may supply presence data 216 to applications that are registered to receive presence feedback in various ways. For example, the access manager 130 may send notifications having presence data 216 to register applications in response to recognition of users and when a group of users recognized as present changes. In addition or alternatively, access manager 130 may post presence data 216 to an established location or otherwise make the presence data 216 accessible applications for retrieval by applications.

Figure 3:
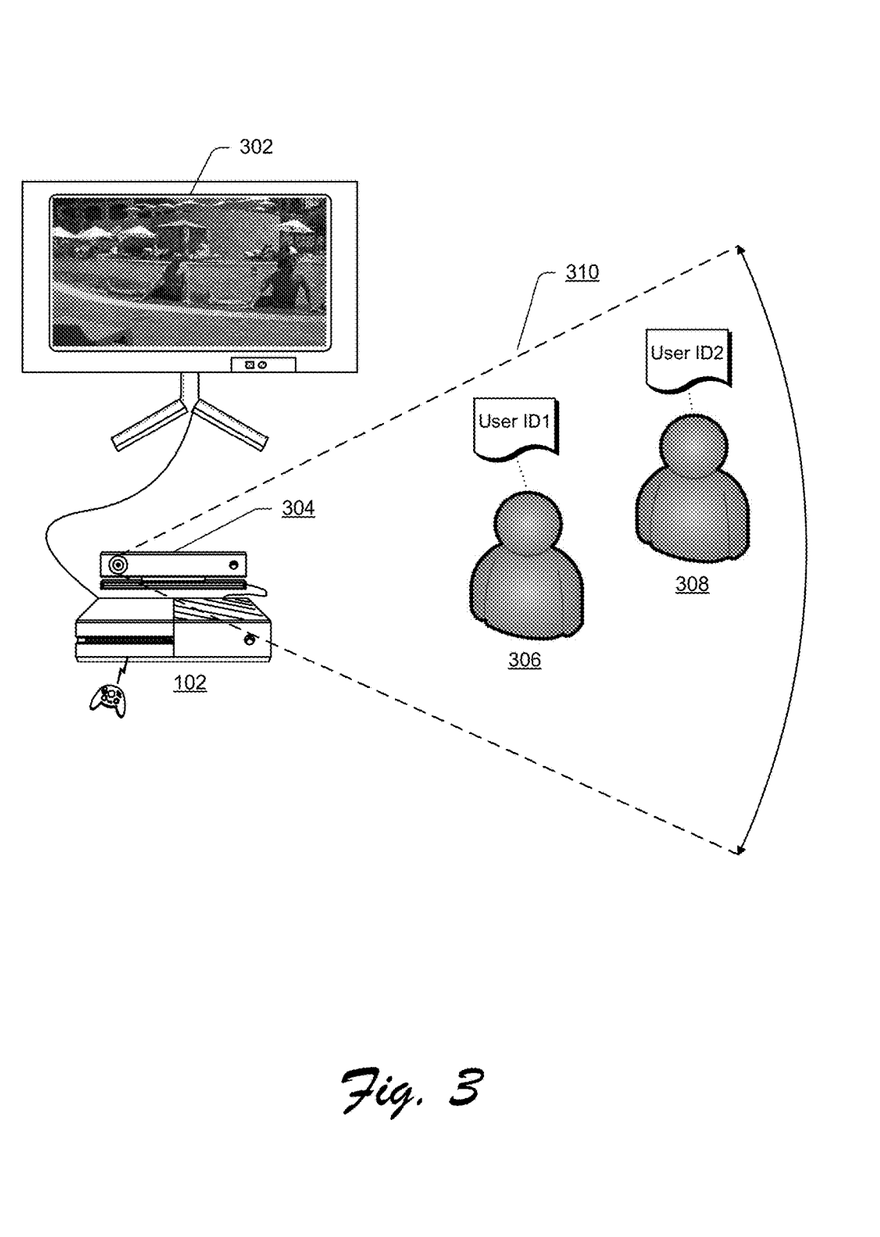
FIG. 3 is a diagram illustrating details of a presence-based content control scenario in accordance with one or more implementations.
Figure 4:
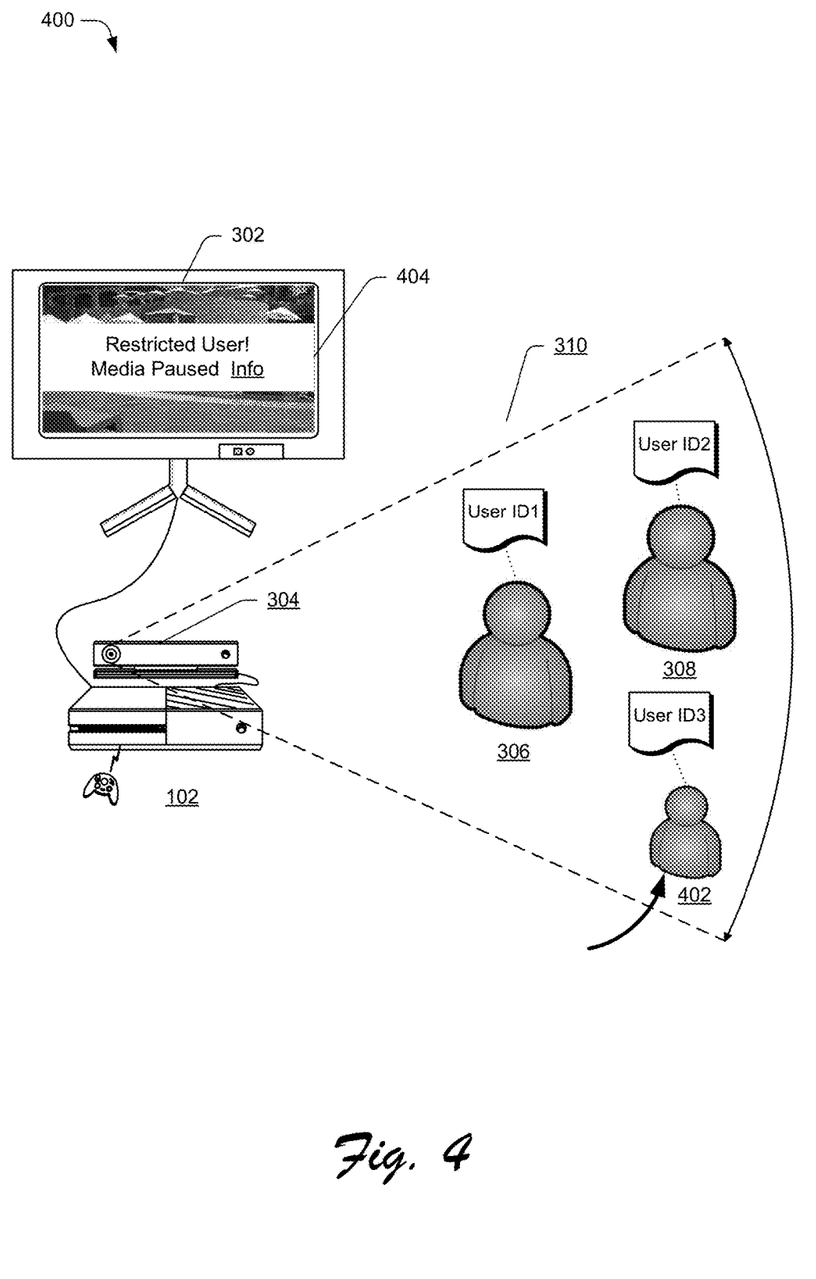
FIG. 4 is a diagram illustrating details of a presence-based content control scenario when a restricted user is detected in accordance with one or more implementations.

By way of example, consider now representative scenarios in which content is controlled based on user presence in accordance with techniques described herein that are depicted and discussed in relation to FIGS. 3 and 4. In particular, FIG. 3 is a diagram depicting generally at 300 a presence-based content control scenario in accordance with one or more implementations. Here, a computing device 102 is represented as being used to output a content presentation 302. In connection with the content presentation 302, a camera 304 may be employed to recognize the presence of users viewing the content presentation 302. For example, user 306 and user 308 are represented as being with a field of view of the camera 310 and therefore recognized as being present. Note that one of users 306, 308 may be logged-in to gain access to the presented content whereas the other one of the users 306, 308 may be recognized without being authenticated or logged-in. The users 306, 308 in this example may represent adults who are accessing and watching a movie from a streaming video service. Control data 214 associated with the users 306, 308 may permit the user to watch the movie. Accordingly, the users are unrestricted with respect to the content presentation 302 and therefore the access manager 130 and/or application 110 being used to output the content allow playback of the movie to proceed.

When presence of a user that is restricted is detected, though, the access manager 130 and/or applications 110 may apply one or more actions to control the presentation of content. This scenario is represented in FIG. 4. In particular, FIG. 4 is a diagram depicting generally at 400 details of a presence-based content control scenario when a restricted user is detected in accordance with one or more implementations. Here, another user 402 is depicted as entering into the field of view 310 during the content presentation 302 described in relation to FIG. 3. In this example, the user 402 may represent a child of the adults. Parental controls and/or age based restrictions may be established by the child's parents or otherwise. Accordingly, control data 214 associated with the user 402 may place content restrictions upon with respect to the content presentation 302. As such, the user 402 is restricted with respect to the content presentation 302 and various control actions may be taken in response to detecting presence of the user 402.

By way of example and not limitation, FIG. 4 shows a notification 404 as being output to block the content presentation 302. In addition, playback of the movie may be paused. The notification 404 may provide an indication that a restricted user is present as well as other information. A link or other suitable instrumentality may also be provided that is operable to obtain additional information, explore options for other content or versions of the movie, authorize playback, change settings, and so forth. A variety of other control actions are also contemplated examples of which are discussed above and below. Note that control actions, such as display of the notification 404, may be taken substantially in real-time as presence of a restricted user is recognized. Thus, the playback of content may be paused or otherwise interrupted right when the child walks into the room (e.g., into the field of view 310). In this way, the child is not exposed to inappropriate and unauthorized material. It should also be noted that restrictions may be enforced for the child based on presence recognition even if the child is logged-in to and using a parent or family account that is authorized to access content that is restricted for the child based on parental controls. In other words, the presence based content restrictions are separated from account-based authorizations.

Figure 5:
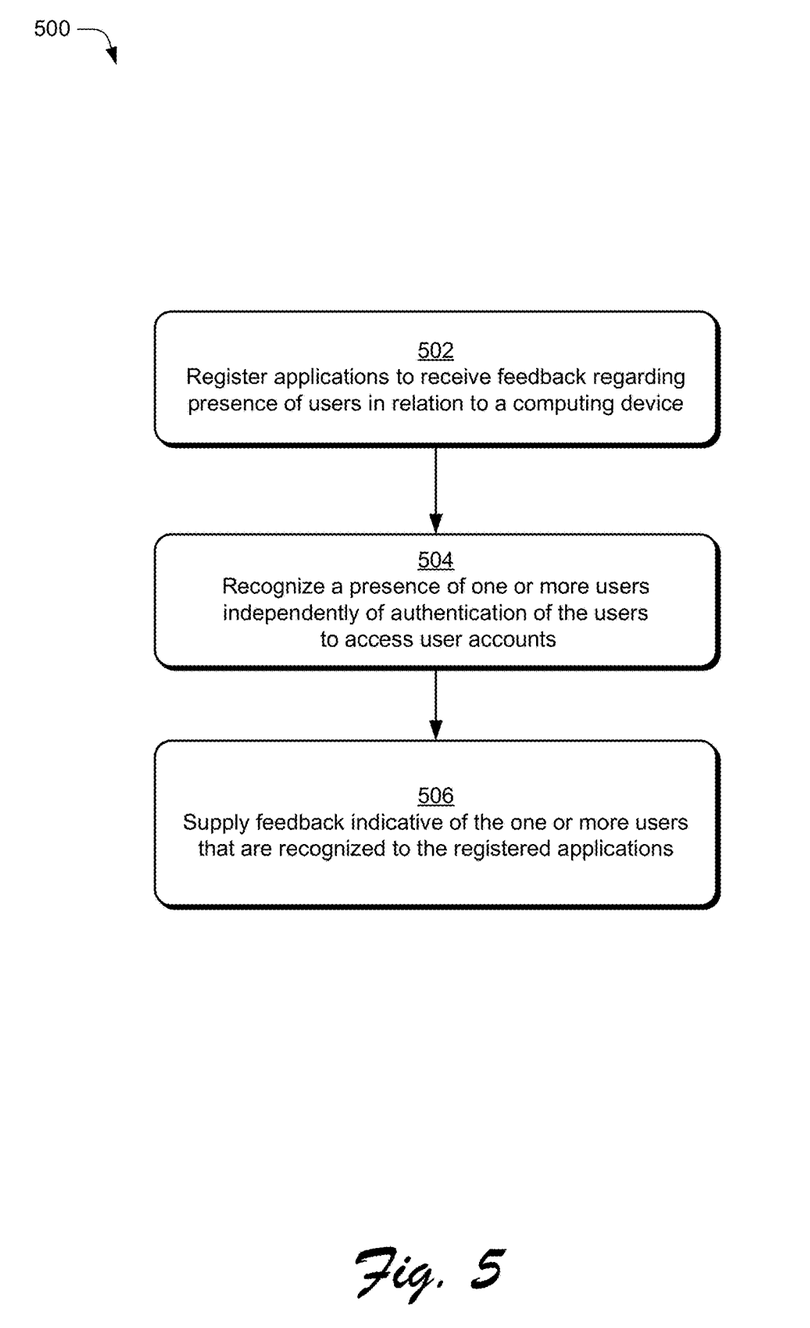
FIG. 5 is a flow diagram that describes details of an example procedure for supplying presence feedback to applications in accordance with one or more implementations.
Figure 6:
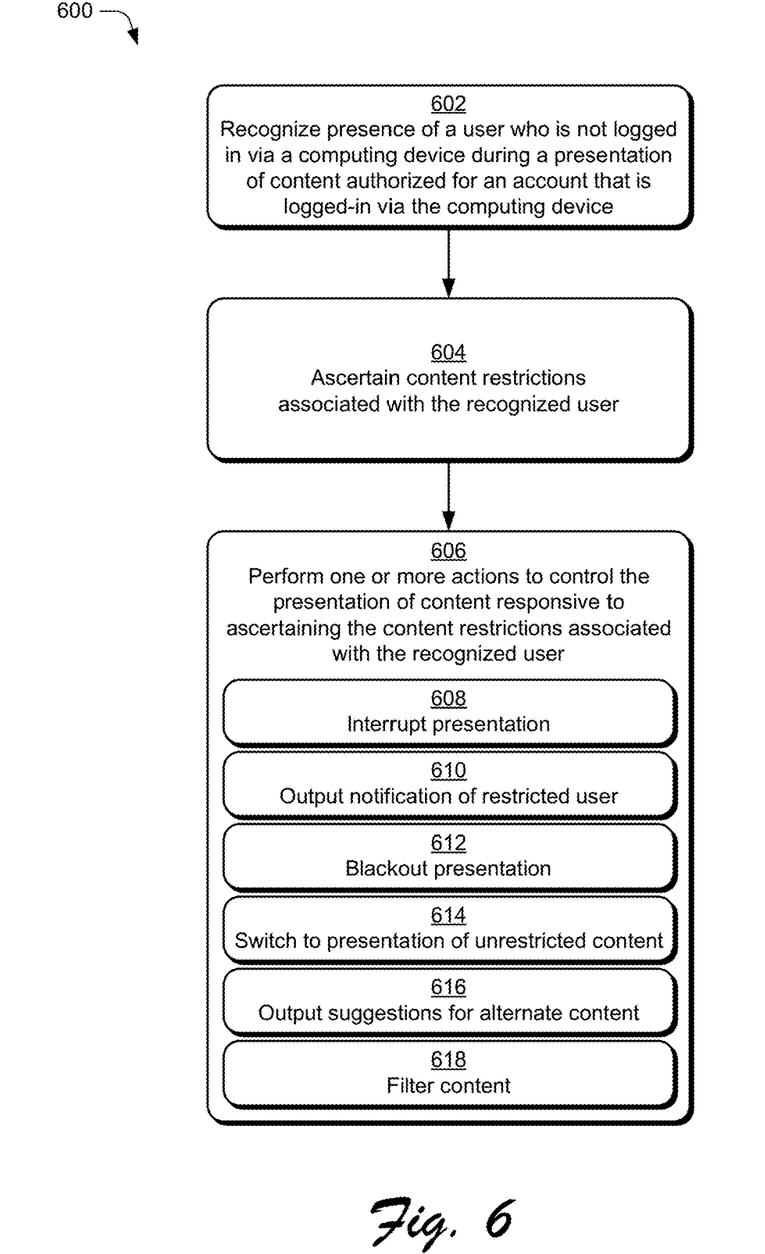
FIG. 6 is a flow diagram that describes details of an example procedure for performing control actions based on user presence in accordance with one or more implementations.
Figure 7:
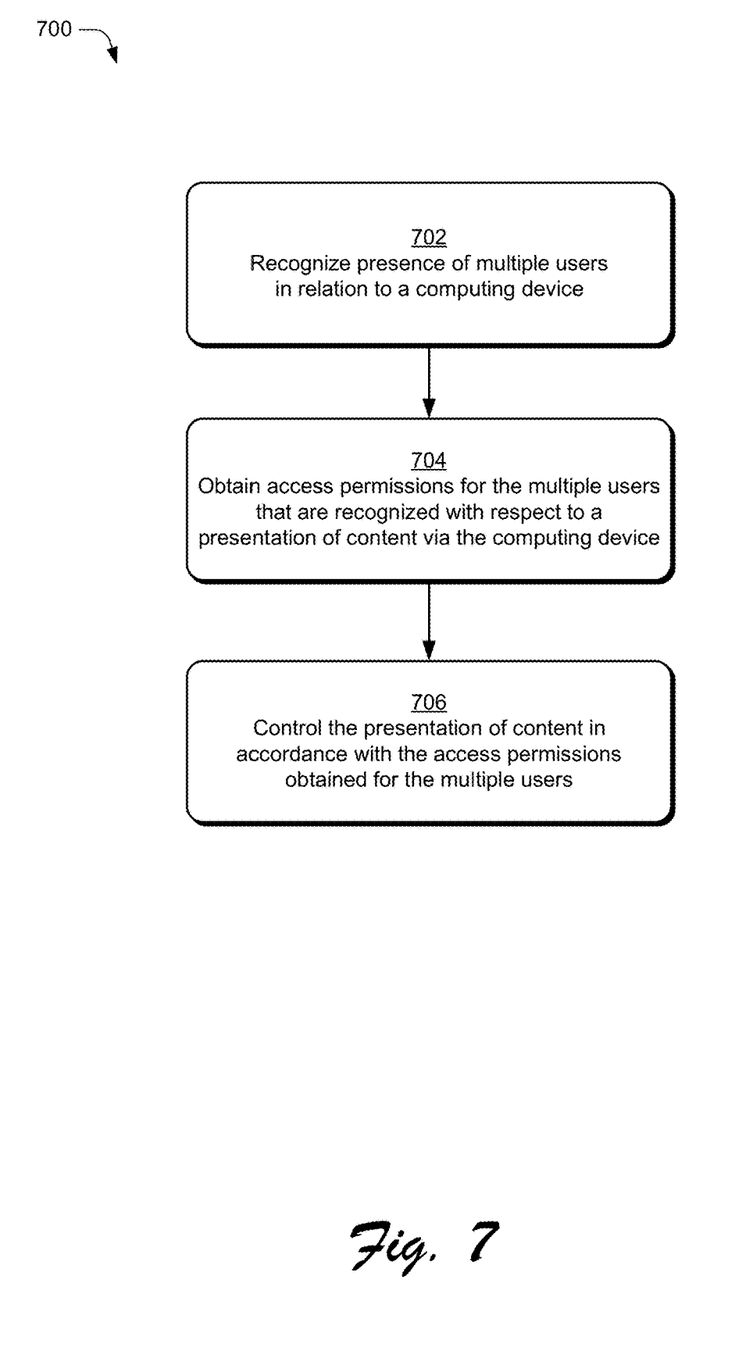
FIG. 7 is a flow diagram that describes details of an example procedure for controlling content based on presence of multiple users in accordance with one or more implementations.

Additional aspects of presence-based control techniques are discussed in relation to example procedure of FIGS. 5 to 7. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks. In at least some embodiments, the procedures can be implemented by way of a suitably configured computing device, such as the example computing device 102 of FIG. 1 that includes or otherwise makes use of an access manager 130, sensors 128, applications 110 and/or operating system 108.

FIG. 5 is a flow diagram that describes details of an example procedure 500 for supplying presence feedback to applications in accordance with one or more implementations. Applications are registered to receive feedback regarding presence of users in relation to a computing device (block 502). Presence of one or more users is recognized independently of authentication of the users to access user accounts (block 504). Then, feedback indicative of the one or more users that are recognized is supplied to the registered applications (block 506).

For example, an access manager 130 as described previously may be configured to enable applications to register to receive feedback related to presence of users. In one approach, one or more application programming interfaces (API) may be exposed to facilitate registration of applications with the access manager 130, communication of feedback and other data between the access manager 130 and applications 110, and other interactions related to presence-based content control. The access manager 130 may also be configured in various ways to recognize user presence. For example, presence indicators obtained via various sensors 128 may be compared with profiles associated with different users, as described previously. In addition, recognizing presence of users may include interpreting image data obtained via a camera associated with the computing device to detect the one or more users. Further, recognition of presence may be based at least in part upon indications obtained from presence devices associated with the multiple users configured to the provide the indications, such as access cards, badges, key fobs, and other suitable wearable devices 124. In an implementation, presence devices may be visually recognized by a camera or other sensors. For example, a bar code, numeric code, pattern or other indicators of presence devices may be detected by camera-based scanning and used for user recognition. In another approach, presence devices may be configured to transmit presence indicators that enable user recognition for receipt by a sensor in the form of a corresponding receiver. For example, a beacon signal that may be used to identify a presence device, and therefore presence of a corresponding user, may be communicated via a wireless connection such as via a Wi-Fi connection, Near Field Communication (NFC), Bluetooth connection or other suitable communication channel. A variety of other examples are also contemplated.

Thus, one or more users may be recognized as being present based on the analysis of presence indicators and/or other sensor data. As noted, presence may be separate and distinct from authentication of users to access accounts. Thus, users that are recognized as present may or may not be logged-in to accounts via the computing device. In response to detecting the presence of users, the access manager 130 may communicate feedback regarding users that are present to registered applications. The feedback may take various forms and be supplied in any suitable way. For example, notification messages may be configured to contain presence data 216 and sent to individual applications. In another approach, a broadcast message may be sent out collectively to registered applications. Applications may also be configured to poll the access manager 130 to obtain the feedback.

Generally speaking, the feedback is configured to enable the registered applications to perform access control actions to control presentation of content via the computing device based on recognition of the presence of users. For example, feedback may include presence data 216 including but not limited to indications regarding ages 212 of the users that are recognized and control data 214 indicative of authorizations and/or restrictions associated with the users that are recognized. Thus, content restrictions associated with the users that are recognized may be ascertained using the control data 214. In addition or alternative, global restrictions may be set for a computing device such as age based restriction set by parental controls. In this example, indications regarding ages 212 may be sufficient to enable selection and application of access control actions in dependence upon the global restrictions set for the computing device.

The presence data may be employed as an alternative to basing content control decisions solely on a logged-in user account. Presence indications may also be employed in conjunction with authorization and other information associated with logged-in user account to make determinations regarding control actions to take for different scenarios. In any event, one or more control actions may be selected based upon indications of user presence and the selected control actions are then performed to control a presentation of content in accordance with to content restrictions associated with the recognized user(s). A variety of different control actions are contemplated, some further examples of which are discussed in relation to the following figure.

FIG. 6 is a flow diagram that describes details of an example procedure 600 for performing control actions based on user presence in accordance with one or more implementations. Presence of a user who is not logged in via a computing device recognized during a presentation of content authorized for an account that is logged-in via the computing device (block 602). Detection of user presence may occur in various ways, examples of which can be found in the preceding discussion. Content restrictions associated with the recognized user are ascertained (block 604). This may occur in any suitable way. By way of example and not limitation, content restrictions may be ascertained with reference to presence profiles 206 associated with different users. Generally, the content restrictions associated with recognized users are ascertained without authentication of the user to access a corresponding user account. In one or more implementations, ascertaining content restrictions may involve identifying ages of recognized users and determining age based restrictions set for the computing device. In addition or alternatively, control data 214 that is associated with individual users may be accessed to look-up corresponding content restrictions and/or content authorizations.

Then, one or more actions to control the presentation of content are performed responsive to ascertaining the access restrictions associated with the recognized user (block 606). Examples of control actions may include but are not limited to: one or more of interrupting the presentation (block 608) such as by pausing, turning off the display, switching channels, etc.; outputting a notification regarding the restricted user (block 610) an example of which is the notification 404 discussed in relation to FIG. 4; causing a black-out of the presentation (block 614); switching to a presentation of unrestricted content (block 614) such as an edited version of a program or a different channel; outputting suggestions for alternate content (block 616) such as a different provider, program, channel; or applications; or filtering the content (block 618) to remove restricted items, age inappropriate content, portions of a collection of content items (e.g., images), or filter search results, to name a few examples. Control actions including the enumerated actions and/or other actions may be performed individually and/or in various combinations of multiple actions. Control actions may be perform responsive to determining that one or more recognized users are restricted from viewing presented content. At least some actions may be applied while a restricted user is present and then stopped or reverted when the user is no longer present to restore the presentation of content. For example, if the content is interrupted or blocked the content may remain interrupted or blocked as long as a restricted user is present. However, when the restricted user leaves the room, the access manager may detect that the user is no longer present and take action to restore the presentation of content to the previous state, e.g., playback resumes without restriction.

FIG. 7 is a flow diagram that describes details of an example procedure 700 for controlling content based on presence of multiple users in accordance with one or more implementations. Presence of multiple users in relation to a computing device is recognized (block 702). Here, multiple users may be engaged in viewing a content presentation together, such as a family watching a movie from a streaming video provider. In another example, business colleagues may be participating in a meeting in which a content presentation is involved. In these and other multi-user scenarios, presence of multiple users may be recognized using the techniques discussed herein. This may include recognition using a camera or other sensors to observe the users, capture images and biometric data, perform facial recognition, and so forth. In addition or alternatively, recognition may make use of presence devices worn by, carried by, or otherwise associated with users, such as access cards, badges, or key fobs that provide presence indications as discussed previously.

Access permissions are obtained for the multiple users that are recognized with respect to a presentation of content via the computing device (block 704) and then, presentation of content is controlled in accordance with the access permissions obtained for the multiple users (block 706). Here, an access manager 130 may operate to ensure the each of the multiple users is permitted to view the content that is being presented. For example, access permissions may be reflected via presence data 216 that is generated for recognized users as previously discussed. Presence data 216 may be configured using presence profiles 206 that are maintained for different users. As long as restricted users are not detected, the content presentation may be output without interruption or restrictions. On the other hand, if one or more users are restricted, control actions may be taken to apply specified restrictions during the content presentation. For example, for the family movie the movie may be blocked, portions of the movie may be edited or skipped, an alternative movie may be suggested, and so forth. In the business meeting example, content may be redacted or some material may be removed from the presentation, selected data or slides may be skipped, restricted users may be prompted to leave the meeting during some time periods, and so forth. In any case, content may be controlled in accordance with the access permissions established for multiple users and independent of which of the multiple users currently is logged in via the computing device.

Having considered example details and procedures for presence-based content control, consider a discussion of an example system in accordance with one or more implementations.

Example System

Figure 8:
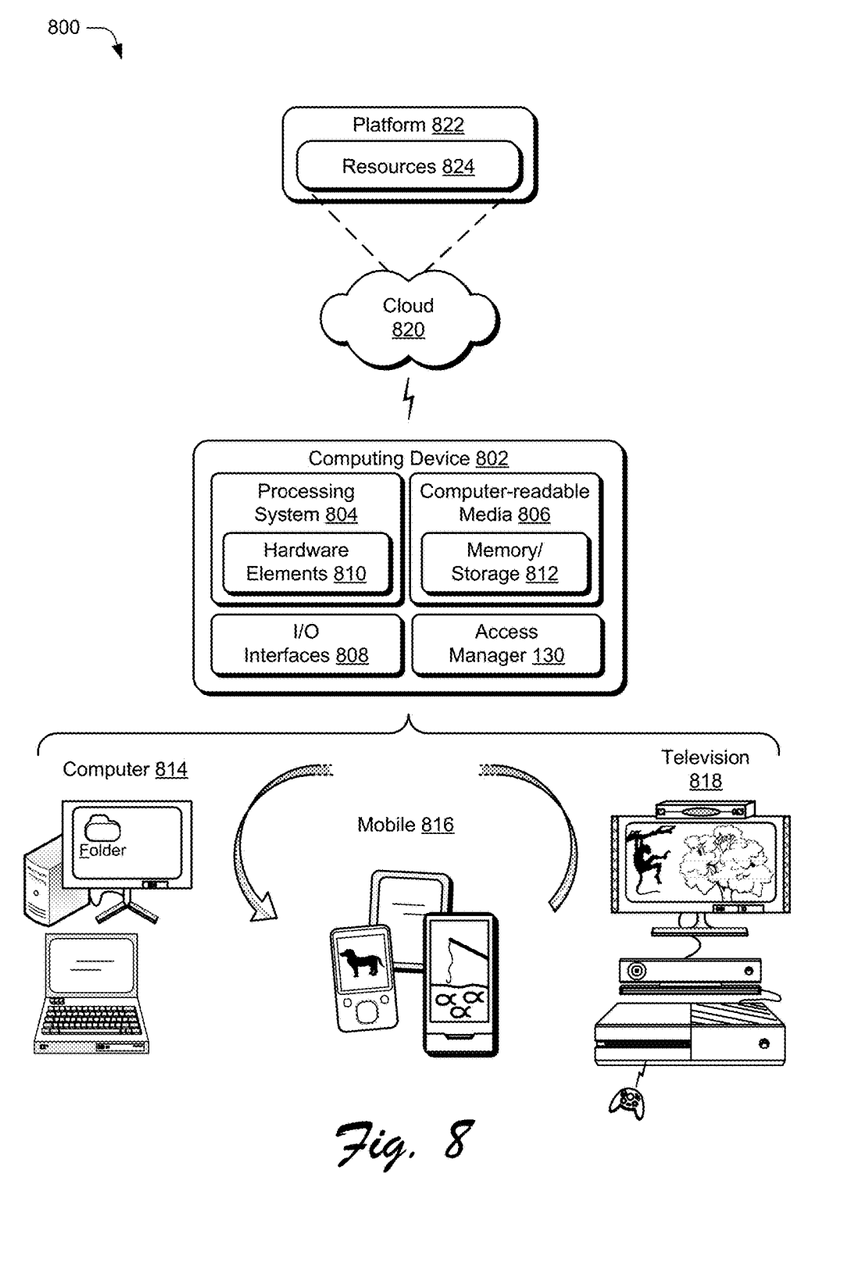
FIG. 8 is a block diagram of a system that can be employed for presence-based content control in accordance with one or more implementations.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, access manager 130, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the access manager 130 on the computing device 802. The functionality represented by the access module 130 and other modules/applications may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a computing device, comprising:
   supplying feedback to an application, the feedback regarding a recognized presence of one or more users in relation to the computing device, the feedback including content restrictions associated with a recognized user who is not logged in via the computing device during a presentation of content authorized for an account that is logged-in via the computing device;
   initiating a transition from an account-based content control to a presence-based content control that correlates with the content restrictions of the presentation of the content; and
   restoring the presentation of the content to a previous state without the content restrictions based on the recognized user who is not authorized to view the presentation of the content no longer being detected as a presence in relation to the computing device.

2. The method as recited in claim 1, wherein the account-based content control includes control actions that control the presentation of the content via the computing device based on the logged-in account.

3. The method as recited in claim 1, wherein the presence-based content control includes control actions that control the presentation of the content via the computing device based on the recognized presence of the one or more users; and the method further comprising:
   performing the control actions to control the presentation of the content in accordance with the content restrictions associated with the recognized user who is not logged in via the computing device.

4. The method as recited in claim 1, wherein the feedback includes an indication of an age of the one or more users who are recognized.

5. The method as recited in claim 1, wherein the feedback includes control data indicative of authorizations and restrictions associated with the one or more users who are recognized.

6. The method as recited in claim 1, wherein the recognized presence of the one or more users is based on indications from devices that detect or indicate the recognized presence of the one or more users.

7. The method as recited in claim 1, further comprising:
   ascertaining the content restrictions associated with the recognized user; and
   performing control actions to control the presentation of content responsive to the ascertaining and in accordance with the content restrictions associated with the recognized user.

8. The method as recited in claim 7, wherein the content restrictions include parental restrictions established for the computing device for the recognized user.

9. The method as recited in claim 7, wherein the control actions to control the presentation of the content include interrupting the presentation responsive to determining that the content restrictions restrict the recognized user and outputting a notification regarding the presence of the recognized user who is restricted.

10. A method implemented by a computing device, comprising:
recognizing a presence of a user in relation to the computing device who is not logged-in via the computing device during a presentation of content authorized for an account that is logged-in via the computing device;
detecting that the recognized user who is not authorized to view the presentation of the content is no longer present; and
responsive to the detecting, restoring the presentation of the content to a previous state without content restrictions.

11. The method as recited in claim 10, wherein the presence of the user is recognized via a camera associated with the computing device.

12. The method as recited in claim 10, wherein the content restrictions are associated with the recognized user and are ascertained without authentication of the recognized user to access a corresponding user account.

13. The method as recited in claim 10, wherein the content restrictions are ascertained by identifying an age of the recognized user and determining age-based restrictions established for the computing device.

14. The method as recited in claim 10, further comprising:
performing one or more operations to control the presentation of the content, including providing suggestions for alternate content and one or more of: interrupting the presentation, outputting a notification regarding the presence of the recognized user, blacking-out a display screen on which the content is presented, switching to a presentation of unrestricted content, or filtering the content.

15. The method as recited in claim 14, further comprising:
determining, based on the content restrictions that are associated with the recognized user, whether the recognized user is restricted from viewing the presentation of the content; and
in response to the determining that the recognized user is restricted from viewing the presentation of the content, performing the one or more operations to control the presentation of the content while the recognized user is present.

16. A computing device, comprising:
a processing system operable to implement an access manager configured to:
obtain content permissions for each of two or more users who have a recognized presence with respect to the presentation of content for display;
initiate a transition from an account-based content control to a presence based content control; and
control the presentation of the content using the presence-based content control in accordance with the content permissions obtained for each of the two or more users independent of which of the two or more users are currently logged in via the computing device and independent of user-input from the two or more users.

17. The computing device as recited in claim 16, wherein the access manager is implemented as a component of an operating system of the computing device.

18. The computing device as recited in claim 16, wherein the access manager is further configured to register applications to obtain feedback regarding the recognized presence of the two or more users and to supply feedback indicative of the two or more users that are recognized to the registered applications.

19. The computing device as recited in claim 16, further comprising a camera, and wherein the recognized presence of the two or more users is based at least in part on image data obtained via the camera.

20. The computing device as recited in claim 16, wherein the access manager is further configured to detect that a recognized user, who is not logged-in via the computing device, is no longer present and restore the presentation of the content to a previous state without content restrictions.

* * * * *